April 23, 1968
E. DONATH
3,380,006
LOGIC CIRCUITS
Filed Aug. 11, 1964
3 Sheets-Sheet 1
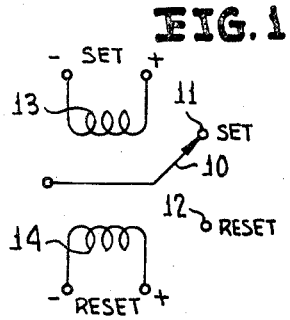
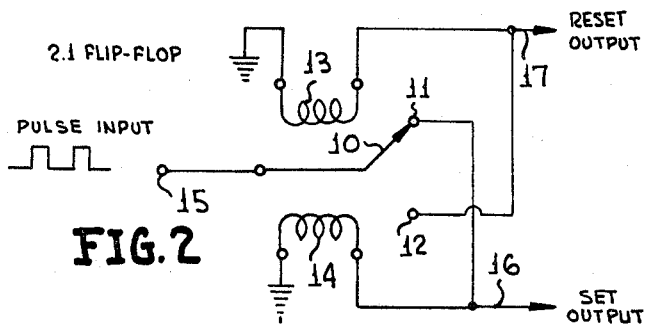
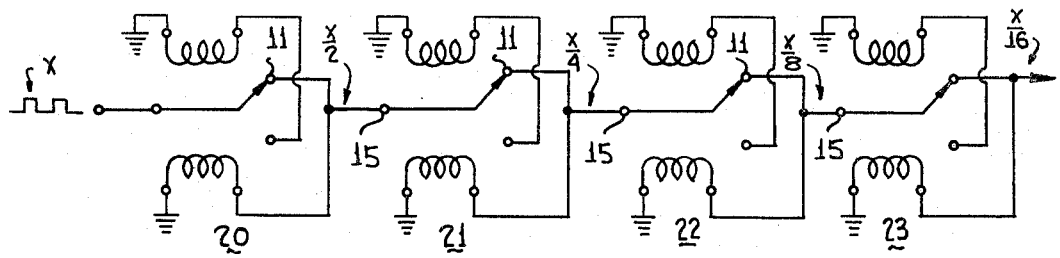
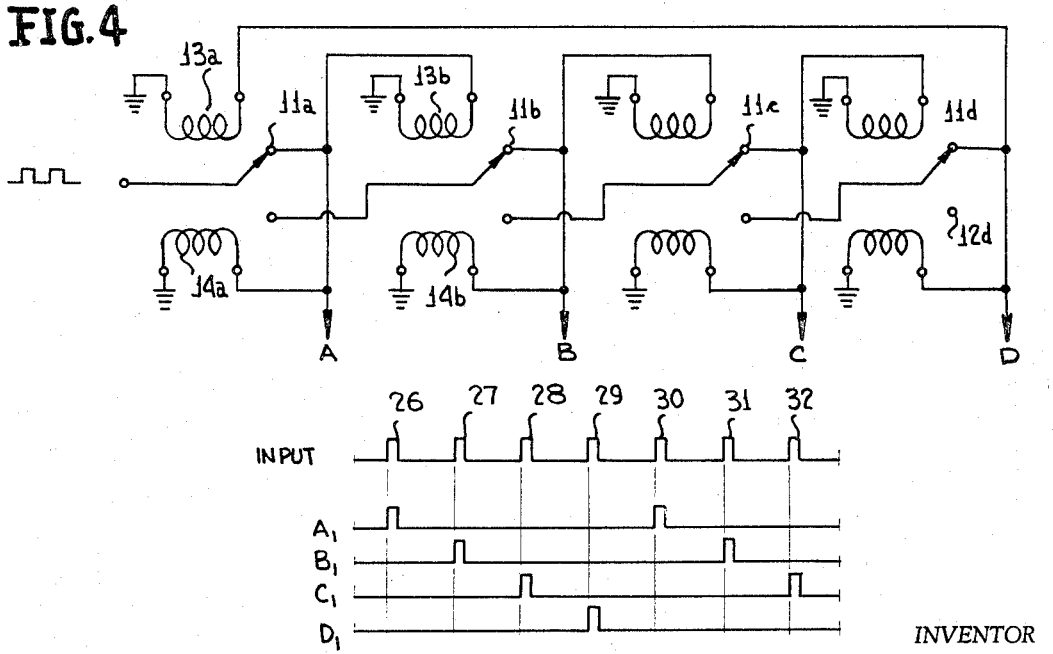
INVENTOR
ERWIN DONATH
BY *Hurvitz & Rose*
ATTORNEYS April 23, 1968  E. DONATH  3,380,006
LOGIC CIRCUITS
Filed Aug. 11, 1964  3 Sheets-Sheet 2
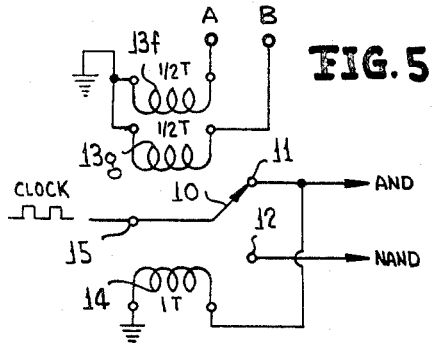
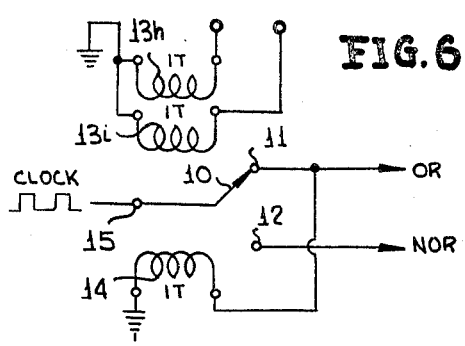
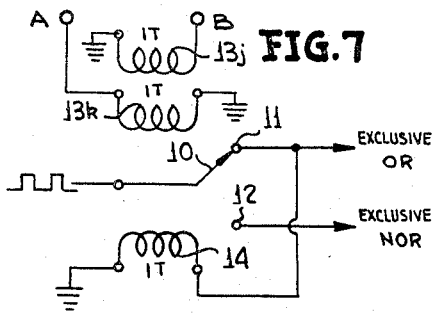
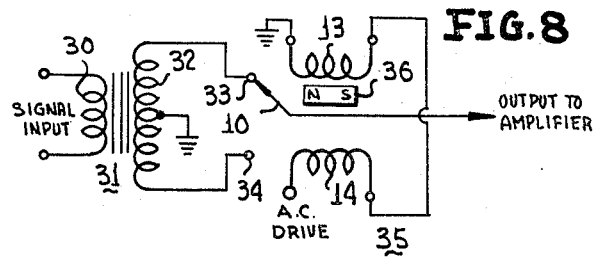
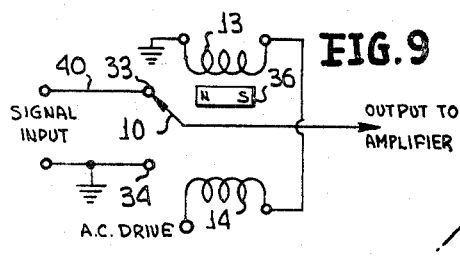
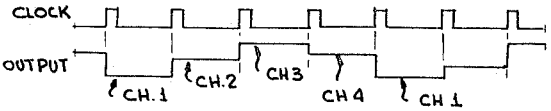
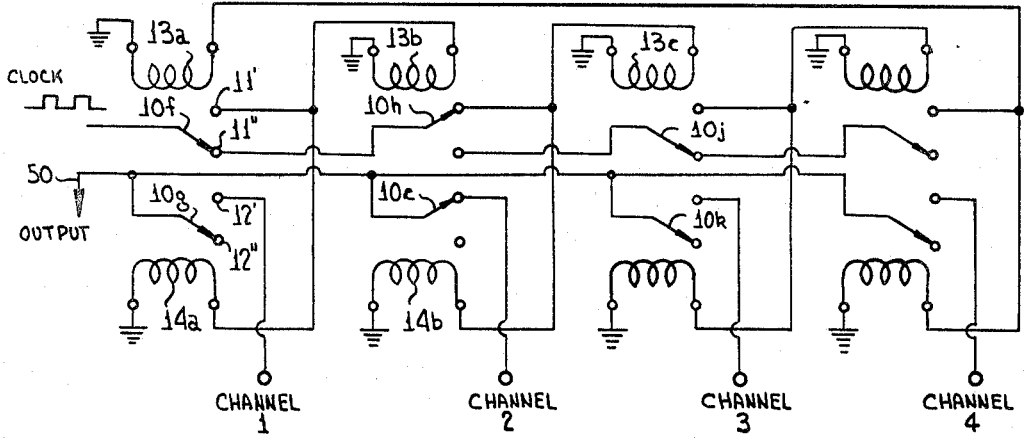
INVENTOR
ERWIN DONATH
BY Hurvitz & Rose
ATTORNEYS April 23, 1968   E. DONATH   3,380,006
LOGIC CIRCUITS
Filed Aug. 11, 1964   3 Sheets-Sheet 3
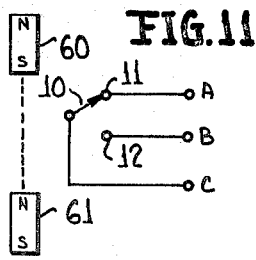
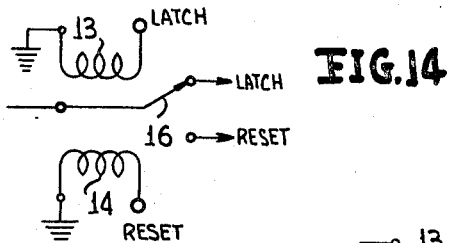
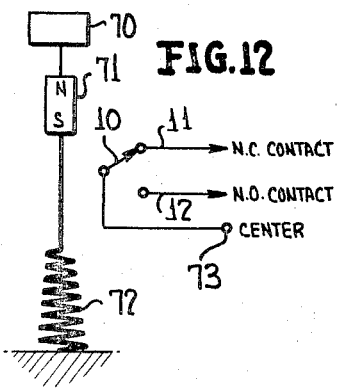
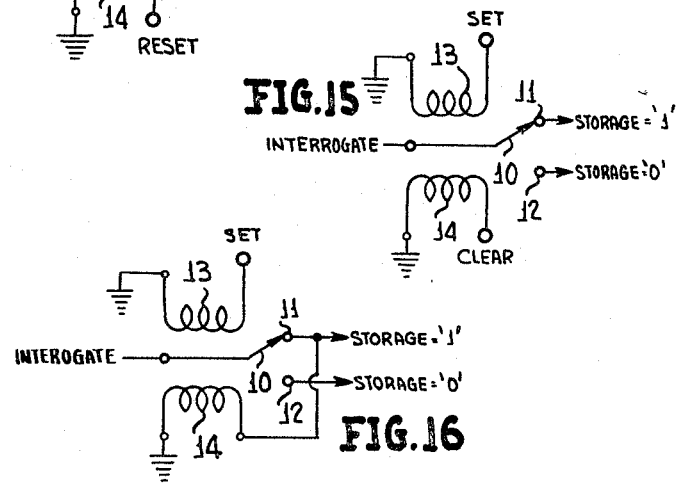
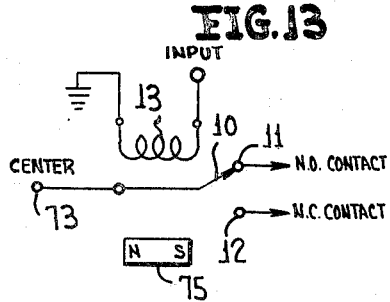
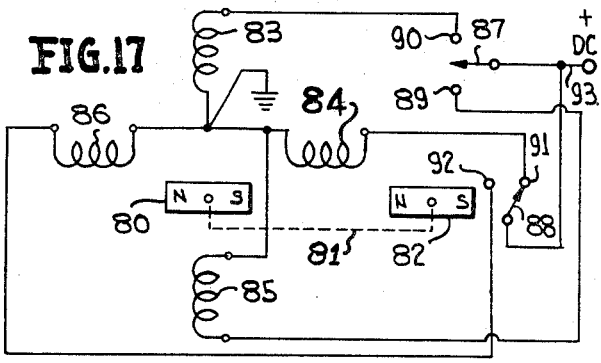
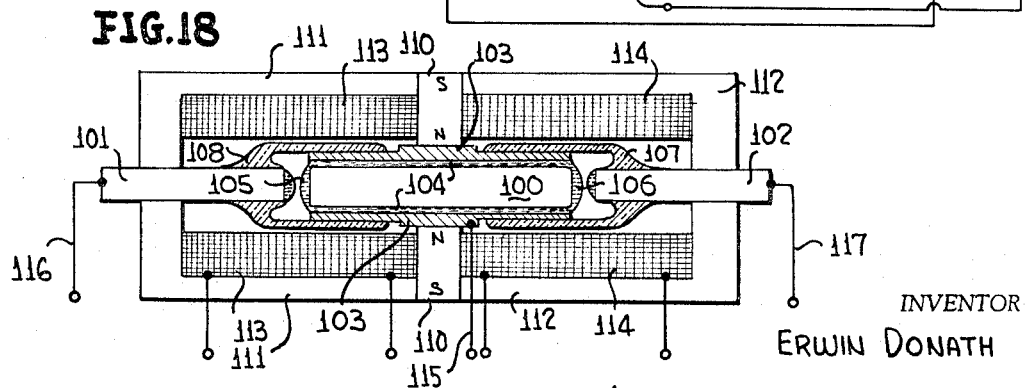
INVENTOR
ERWIN DONATH
BY Hurvitz & Rose
ATTORNEYS

United States Patent Office 3,380,006
Patented Apr. 23, 1968

3,380,006
LOGIC CIRCUITS
Erwin Donath, Princeton, N.J., assignor to Fifth Dimension Inc., Princeton, N.J., a corporation of New Jersey
Filed Aug. 11, 1964, Ser. No. 388,891
2 Claims. (Cl. 335—56)

The present application relates generally to relay logic systems, and more particularly to relay logic systems utilizing a bistable relay which can operate in response to pulses shorter in time than the break times of the relay contacts.

A relay in accordance with the requirements of the present invention is disclosed in an application for U.S. Patent S.N. 180,090, filed March 16, 1962, now U.S. Patent No. 3,144,533, in the name of E. Donath, and entitled, "Mercury Relay."

In the relay of S.N. 180,090, a free two-ended armature or slug rides in a cushion of mercury within an enclosing cylinder and is movable by magnetic forces selectively into contact at its two free ends with stationary contacts. The latter are mercury wettable, as are the ends of the armature, so that circuits are closely selectively through mercury, the slug acting essentially as a carrier of mercury. Surface tension forces maintain the slug in either of its actuated positions. The slug can be selectively moved in either sense by selectively energizing control coils located externally of the enclosing cylinder, and it is a unique property of the relay that a short control pulse of current applied to the proper coil can cause transfer of the slug, the pulse enduring for a shorter time than is required for the slug to break its existing circuit. Accordingly, the relay maintains its armature condition, i.e., its bistable state, until the control pulse has terminated and only thereafter transfers its state. Stated in other words, the relay holds its last state indefinitely or until a further pulse establishes the alternate state.

The relay above briefly described lends itself to a wide range of logic and control circuitry, including flip-flops, binary counters, OR gates, NOR gates, exclusive OR and NOR gates, choppers for AC signals, DC to AC converters, oscillators, commutators, limit switches, latching relays, nondestructive memories, destructive read-out memories, and the like. It is the object of the present invention to implement the above devices.

In the drawings:

FIGURE 1 is a schematic diagram of a relay according to the invention, hereinafter called a Logcell;

FIGURE 2 is a schematic circuit diagram of a flip-flop, utilizing the Logcell of FIGURE 1;

FIGURE 3 is a schematic circuit diagram of a binary counter employing Logcells as bistable elements;

FIGURE 4 is a schematic circuit diagram of a ring counter made up of Logcells;

FIGURE 5 is a block diagram of and AND and NAND gate, employing a single Logcell;

FIGURE 6 is a schematic circuit diagram of an OR, NOR gate, employing a single Logcell;

FIGURE 7 is a schematic circuit diagram of an EXCLUSIVE OR, EXCLUSIVE NOR gate, employing a single Logcell;

FIGURE 8 is a circuit diagram of a signal chopper for AC signals, employing a single Logcell;

FIGURE 9 is a DC signal chopper employing a single Logcell;

FIGURE 10 is a schematic circuit diagram of a commutator employing stacked Logcells;

FIGURE 11 is a diagrammatic showing of a limit or proximity switch employing a single Logcell;

FIGURE 12 is a circuit diagram of a push button switch employing a Logcell;

FIGURE 13 is a circuit diagram of a monostable relay employing a Logcell;

FIGURE 14 is a circuit diagram of a latching relay employing a Logcell;

FIGURE 15 is a circuit diagram of a non-destructive memory employing a Logcell;

FIGURE 16 is a circuit diagram of a destructive read-out memory employing a Logcell; and FIGURE 17 is a circuit diagram of a DC motor employing Logcells to provide commutation; and FIGURE 18 is a view in section of a novel Logcell structure according to the invention.

Referring now to the drawings, the armature of a Logcell, which in fact is a slug or magnetic armature having two stable positions within the Logcell, is shown as a movable contact 10, capable of contacting either of two stationary contacts 11 and 12. A set coil 13 is provided, which when subjected to a short pulse, pulls the armature 10 up; a reset coil 14 is also provided, which when activated, pulls the armature 10 down. Armature 10 makes with the stationary contacts 11 and 12 in the up and down positions, respectively. In each case, the actuating pulse is so short, about 200 μs., that the armature 10 does not break its contact by the end of the pulse. Transfer in such case requires about 1 millisecond. The armature starts to move as soon as the pulse is applied, but it must move about 2 to 3 thousandths of an inch before break occurs in the memory at the contacts, and this movement requires a greater time than a pulse length.

Assuming, then, that armature 10 is in "reset" position, i.e., down, a control pulse applied to set coil 13 will be completed, say in 200 μs., the armature 10 will remain in this condition until the control pulse terminates, and then after a delay of .8 millisecond will break. A further delay of about .2 ms. then occurs before make occurs at set contact 11. Armature 10 will then remain in set position until a 200 μs. reset pulse is applied to reset coil 14. On such application about a 1 ms. delay will occur, until the set contact actually breaks.

A single set of coils may simultaneously operate plural sets of contacts, or more than two coils may be required for a single set of contacts, as will appear hereinafter. Input pulses or control pulses may obviously be considerably longer than .2 ms., but control pulses must be spaced in most applications sufficiently to enable the contacts to open and reclose in response to one control pulse, before a succeeding control pulse appears.

The present Logcell is capable of handling about 4 amperes of current on a continuous basis, makes and breaks without chatter in substantially vertical current rise and fall if the external circuit permits, and has effectively zero contact resistance. Coils currently employed are about 20 ohms and operate at 20 mils on 5 v.

However, various sizes of cells, coils, etc., can be employed to suit the designer, within rather wide limits, and will provide varying operating characteristics.

In FIGURE 2, representing a flip-flop, contact 10 is connected to a pulse input terminal 15; contact 11 is connected in series with coil 14 to ground and contact 12 in series with coil 13 to ground. Set output is taken from terminal 11 and reset output from terminal 12 on leads 16 and 17, respectively. In operation, input of a pulse to terminal 15 results in transfer of the pulse via armature 10 and contact 11 to the coil 14 which pulls armature 10 down to contact 12. This results in transfer of the next pulse to coil 13, via contact 12. Subsequent energization of coil 13 by a further succeeding pulse, results in pull up of the armature 10 and the sequence of operations can proceed indefinitely. It is essential to the operation of the flip-flop that transfer of contacts take place after each pulse is completed. At the same time it is essential that the total energy of each pulse, or substantially the total energy of each pulse, be applied to the proper transfer coil. These requirements are automatically met by the Logcell, because of the ballistic character of the operation and because of the use of mercury contacts, as above explained.

In the system of FIGURE 3, a series of Logcell flip-flops are arranged in sequence, being identified by the reference numerals 20, 21, 22, and 23. The set output of each Logcell flip-flop is connected to the input terminal 15 of the succeeding flip-flop. This results in transfer of the state of each of the Logcell flip-flops in sequence, in response to completion of a cycle of operations of the preceding flip-flop. No intermediate amplification or wave shaping is required, i.e., each Logcell is capable of driving the next Logcell directly, since each Logcell is capable of handling a high energy input pulse. More specifically, the input pulses are always applied in parallel to a number of coils equal to the number of stages in the counter, but must pass through the Logcells in series. It is a primary property of the Logcell that it is capable of handling sufficient current to enable such operation, without intermediate amplification or the provision of intermediate power sources.

In FIGURE 4 is illustrated a ring counter, following the configuration of FIGURE 3, except in that the last stage of the counter includes a blank contact 12d, and that the last reset contact 11d is brought back through lead 25 to energize the coil 13a of the initial stage. In response to successive pulses applied to the input terminal 15 of the counter, the successive stages of the counter will operate to produce ouputs in succession at the terminals A, B, C, and D, followed by a further pulse from the terminal A. The input pulses are illustrated at 26, 27, 28, 29, 30, 31, and 32, and the corresponding ouput pulses at the terminals A, B, C, and D are illustrated on lines labelled A1, B1, C1, and D1, in proper time positions.

In FIGURE 5 is illustrated the mode of connecting a Logcell to operate as an AND gate and as a NAND gate. In this application, the input clock pulses are applied to terminal 15, as before, and the terminal 11 is carried back through the coil 14 to ground. For the normal coil 13 (as in FIGURE 1) is substituted two parallel coils 13f and 13g, each of which is designed to supply half the magnetic power of the single coil of FIGURE 1, and each of which is supplied with its own input terminal, these being labelled A and B. To the left of the circuit diagram is illustrated a truth table for the configuration of FIGURE 5. The coils 13f and 13g are wound in the same sense, and are so designed that either one cannot operate the armature 10 but both together can. If zeros are applied to the two terminals A and B, no current will flow to the coils, 13f and 13g and no change will take place in the output. The truth table shows a zero output for the AND column, assuming that the armature 10 is normally in contact with terminal 12. At the same time the NAND output 12 will be provided with a pulse. Upon application of a pulse to either of the coils, at the terminals A and B, the armature 10 will not be pulled up, because the coils are half-powered; and accordingly the AND terminal 11 will receive zeros while the NAND terminal to which the armature 10 is normally connected will provide pulses. Upon application of pulses to both A and B at the same time, on the other hand, the armature 10 will pull up and an AND output will appear on terminal 11 while zero will appear on AND terminal 12. The system resets itself, in that when the armature 10 is pulled up to the contact 11, circuit is made through the coil 14 which has the full number of turns required to reset the armature 10 on the contact 12. Thereupon the system is ready for the next pulse.

Referring now to FIGURE 6 of the drawings, there is illustrated schematically an OR and NOR gate utilizing a Logcell. Here the terminal 11 presents an OR output, and the terminal 12 a NOR output. The terminal 11 is permanently in circuit with coil 14. The coil 14 is capable when energized of pulling down the armature 10 and such energization occurs when A and B are at "zero" and a low pulse is applied, so that armature 10 is always reset down, when A and B are not energized, and this is its normal condition. The coils 13h and 13i are likewise, each in its own right, capable of pulling up the armature 10 to contact the OR output terminal 11. Accordingly, a control input to either of the terminals A, B in conjunction with a clock pulse will result in an output through the OR terminal 11 and likewise application of simultaneous control signal to the terminals A and B will result in an OR output. A NOR output, at the terminal 12 provides a "one" whenever the OR terminal 11 provides a "zero," and vice versa.

In FIGURE 7 is provided a circuit diagram of an EXCLUSIVE OR and EXCLUSIVE NOR circuit. This is accomplished by reversing the polarities of one of the coils 13h, 13i, in FIGURE 6, so that simultaneous application of pulses to coils, 13j and 13k (FIGURE 7), will provide zero magnetic force on armature 10. On the other hand, application of current to either terminal A or terminal B alone results in pull up of the armature 10 and consequently an output to the exclusive OR terminal 11.

In the system of FIGURE 8, AC signal is applied to the primary winding 30 of a transformer 31 having a center grounded secondary winding 32, the latter having output terminals 33 and 34 which are always of opposite polarity with respect to ground. A Logcell 35 is provided, having a movable armature 10 and for which the contacts 33, 34 represent the stationary contacts of the Logcell, which in other figures of the drawings have been labelled 11 and 12. An AC drive is applied in series to the coils 13, 14 of the Logcell which are oppositely wound and so biased by permanent magnet 36 that one coil supersedes the other in one polarity of the AC drive and the other coil supersedes the one in the other polarity of the AC drive. Accordingly, AC signal applied to the armature coils 13, 14 result in alternate movement of the armature 10 to the terminals 33, 34 in succession, and consequently provide a chopped output from terminals 33, 34, representing the AC signal originally supplied by the transformer 31.

The system of FIGURE 8 finds its parallel in the system of FIGURE 9, wherein the signal to be chopped is a DC signal with respect to ground available on a lead 40. The armature 10 will travel in alternation from terminal 33 to 34 to 33, etc., producing DC pulses with respect to ground having one polarity only.

The system of FIGURE 10 presents a considerable departure from the remaining systems, heretofore described and illustrated, in that each set of coils 13, 14 operates two armatures as 10f and 10g. This can be most easily accomplished by utilizing two separate Logcells having a common set of coils. The net result is that the armatures 10f and 10g of the two Logcells acts as if mechanically locked, and move together to their up and down positions, in response to individual energization of the coils 13a and 13b, respectively. It is assumed that signals are arriving on channel 1, channel 2, channel 3, and channel 4 at all times and that it is desired to commutate these signals to the output terminal 50. It is further assumed that the armatures 10f and 10g are up when the first clock pulse arrives. The signal in channel 1 will then proceed through contact 12[1] and armature 10g to output terminal 50. Clock pulse will at the same time proceed from terminal 11[1] through the coil 13b and pull down the armatures 10f and 10g. The next clock pulse accordingly will find the terminal 12[1] blank and accordingly channel 1 cannot provide signal to the output on the second clock pulse. The first clock pulse not only proceeds to winding 13b but also to winding 14a. The clock pulse which proceeded to winding 14a also proceeds to winding 13b pulling up the armatures 10h and 10i while armatures 10f and 10g are pulling down. On completion of this operation, output proceeds from channel 2 through armature 10*i* to output terminal 50, while a clock pulse proceeds through armature 10*h* to coil 14*b*, pulling down the armatures 10*h* and 10*i*. This clock pulse, however, has prior to the pull down operation energized a succeeding coil 13*c*, pulling up the armatures 10*j* and 10*k*. The operation, as explained for the first two stages, continues from stage to stage until the last stage, representing channel 4, is reached, whereupon the next output pulse is applied to coil 13*a*, pulling up the armature 10*f* and again permitting channel 1 to pass a signal through to the output lead 50. Accordingly, in the interest of brevity, no necessity is seen to exist for continuing the explanation of the operation of the system in respect to each of its stages. Obviously, the system can be extended to as many stages as may be desired, for any given application.

FIGURE 11 illustrates a form of Logcell which dispenses with operating coils and instead relies on a magnet to actuate the armature 10, the magnet being shown, at 60 and 61, in two alternative positions. Assuming that 62 is a signal input terminal, which is connected with the armature 10, and assuming in Logcell applications described hereinbefore, that the stationary contacts of the Logcell are 11 and 12 when the magnet is in the position 60 the armature 10 is pulled up, completing a circuit to terminal A and when the magnet is in the position 61 the armature 10 is pulled down, completing a circuit to the terminal B.

The application of the principles of the system of FIGURE 11 are applied in the system of FIGURE 12 to a push button switch, wherein 70 is the push button, 71 the magnet and 72 is a compression spring which tends to return the magnet 71 upwardly when pressure on the push button 70 is released. Accordingly, the normal position of the armature 10 is up since the normal position of the magnet 71 is up. On depression of the push button 70, magnet 71 is pushed down which pulls contact 10 down, closing the circuit to the contact 12. Contact 11 here is a normally closed contact, contact 12 is a normally open contact and signal is applied at the terminal 73.

The system of FIGURE 13 shows a Logcell in which a magnet 75 normally biases the armature 10 down to the normally closed contact 12 while signal input to the coil 13 results in pull up of the armature 10 and consequently of transfer of signal from input terminal 73 to the "normally open" contact 11. This application of the Logcell is particularly useful as a relay for radio frequency signals, due to the small size of the switch and the low interelectrode capacity resulting from the small size.

FIGURE 14 is provided to indicate that the Logcell is inherently a latching relay. Accordingly, the coil 13 provides a latching coil and the coil 14 a reset coil. Coil 14 can be permanently connected to a source of current of sufficient magnitude to affect reset, and the latching coil either can have more turns than the coil 14 or be provided with sufficiently higher current, that upon energization of the coil 13 the armature 10 will remain in its up position and upon breaking of the circuit will return to its down position. Alternatively, if control pulses are applied to coils 13 and 14, the last applied pulse will determine the position of the armature 10 and in this sense the relay is self-latching.

The system of FIGURE 15 shows a non-destructive memory i.e., energization of the coil 13 may be set to set a storage "1" into the system, which can be interrogated and read out as often as desired without modifying the storage. Similarly, if a clear signal is applied to the coil 14, the armature 10 is pulled down and a storage "zero" is thereby inserted on a non-destructive basis.

In the system of FIGURE 16, on the other hand, the contact 11 is connected back through the winding 14. Accordingly, when the storage is set to the "1" position by energization of the coil 13 the next interrogate pulse proceeding through the contact 11 energizes the coil 14 and pulls the armature 10 down to reset the storage to "zero" position.

The system of the invention can be applied to a DC motor, utilizing two Logcells for commutation in place of the brushes of the DC motor. The speed with which the Logcell can operate and its power handling utility render it particularly useful of this application.

Referring now to FIGURE 17 of the drawings, 80 represents the armature of a DC motor constituted of a permanent magnet having a north and a south pole. The shaft of the motor is represented as 81 and on the shaft is mounted a further permanent magnet 82, which rotates co-phasally with magnet 80. 83, 84, 85, 86 are the armature coils of the motor, within which field magnet 80 rotates. 87 and 88 are Logcell armatures, and 89, 90, 91, 92 the stationary contacts pertaining thereto.

Each of the armature coils 83, 84, 85, 86 is connected to a common ground and input leads 93, 94 extend from opposed armature coils 85, 83 to contacts 89, 90 respectively. Similarly, opposed armature coils 84, 86 extend respectively to contacts 91, 92 respectively. As rotor 80 rotates, its N pole induces voltage of one polarity in its proximate coil, so that voltage of the one polarity, say +, is induced in coils 83, 84, 85, 86 in recited order, assuming clockwise rotation of magnet 80. Magnet 82, rotating synchronously with magnet 80, connects armatures 87, 88 commonly connected to input lead 93 to the contacts 90, 91, 89, 92 in the recited order, with only one of the circuits made at any one time.

It is now assumed that the armatures 87 and 88 of the Logcells A and B of FIGURE 17 are polarized, a matter which will be rendered clear when the structure of FIGURE 18 of the drawings is explained, so that the movable armatures 87, 88, respectively, contact different ones of the stationary contacts 89, 90 and 91, 92, respectively, depending upon whether a north or south pole of the permanent magnet 82 approaches. The armatures 87 and 88 have been illustrated as distributed 90 degrees in space from the center of rotation of the permanent magnet 82. Assuming that DC power is supplied to the lead 93, then, and that a south pole is adjacent to the armature 88, as is illustrated in the drawings, current is led to the field winding 84, which is wound in such sense with respect to the direction of current therein as to cause the south pole of the armature magnet 80 to move clockwise. This rotation subsists through 90 degrees, whereupon the north pole of magnet 82 approaches the armature 87, which in response makes contact with the stationary contact 89, energizing the field winding 85. The south pole of rotating magnet 80 is then adjacent to the winding 85, and the direction of current is such as to continue to impel the armature magnet 80 in its then direction of motion. The south pole of magnet 80 now approaches the winding 86. At the same time the north pole of magnet 82 approaches the armature 88, causing same to contact the stationary contact 92 and energizing the winding 86 which in turn rotates the armature 80 through another 90 degrees. Thereby, the north pole of magnet 82 is caused to approach the armature 87 to cause it to complete a circuit with stationary contact 90 and thus to energize the field winding 83.

In the manner stated, continuous rotation of the armature 80 is attained, the required commutation being affected by the Logcells including armatures 87, 88, and without any requirement for an ordinary mechanical commutator. The system can be so constructed as to be self-starting at any angular position of the armature 80, since one of the armatures 87, 88 contacts one of the stationary contacts 89, 90 or 91, 92, as the case may be, for every position of the permanent magnet 82, and upon application of power through the lead 93 will immediately energize the appropriate one of field coils 83, 84, 85, 86 and provide a motor force to the armature 80.

Referring now to FIGURE 18 of the accompanying drawings, there is illustrated a Logcell switch, of improved design. Essentially the Logcell switch consists of a free moving armature 100 on one side of which is a stationary contact 101 and on the other side of which is a stationary contact 102, the contacts and the armature being cylindrical in shape and in axial alignment and being fabricated of magnetic material such as iron. Surrounding the armature 100 is a non-magnetic metallic open ended cylinder 103, within which the armature 100 may move freely in the direction of its axis (or may rotate). The sleeve or cylinder 103 is fabricated or mercury wettable material, at least on its inner surface, and the inner diameter of the sleeve 103 with respect to the outer diameter of the cylinder 100 is such as to permit the existence of a film or layer of mercury therebetween. The armature 100 is not wettable by mercury, over at least most of its surface, and accordingly can move very freely on the layer of mercury within which it subsists, and which is identified by the reference numeral 104. A small mercury wettable path exists from one end to the other on the armature 100 to facilitate free exchange of mercury between the end of the armature, 105 and 106, which themselves are mercury wettable. Likewise the contacts 101 and 102, at their ends facing the armature 100, are mercury wettable, so that a conductive path through mercury can exist from the armature 100 to either one of the contacts 101, 102, but to only one, depending on the axial position of the armature 100. A mercury-non-wettable glass seal 107 mechanically couples the sleeve 103 to the contact 102. A similar glass seal 108 couples the sleeve 103 to the contact 101, to form an enclosure. This enclosure may be evacuated to form a vacuum, or may be supplied with gas at relatively high pressure, in accordance with mercury switch techniques well known in the art, and which form no part of the present invention. Sufficient mercury is contained in the enclosure formed by the sleeve 103, the glass seals 107, 108 and the end contacts 101, 102, to form the required layer of mercury on the sleeve 103 internally thereof, and to provide a conductive path through mercury for the end contacts, but no excess is provided, so that the non-wettable surfaces remain free of mercury. Stated in another way the wettable surfaces absorb all the available mercury and only sufficient exists to wet these in a thin layer. Various parameters which have been indicated to be essential or desirable for a switch of the Logcell type, in application to U.S. Patent S.N. 180,090, obtain also in the Logcell switch of FIGURE 18, and accordingly are not further described herein. The structure as described to this point is essentially the same as the structure of S.N. 180,090, differing therefrom in constructional details only, but not in principle.

An important feature of the present invention resides in the fact that a ring or annulus of magnetic material 110, surrounds the sleeve 103, and this ring may constitute a permanent magnet, as illustrated having primarily radially directed fields, but if desired may be made of magnetic material but not permanently magnetized. Two magnetic closure cylinders, 111, 112 extend over the exposed ends of the contacts 101 and 102, in close proximity thereto and terminate on the ring 110. These cylinders are closed at their outer ends except for a small opening to provide passages for the contacts 101 and 102, at their remote ends, and abut against the ring at their inner ends, but each provides a hollow internal space within are placed coils 113, 114 for operating the armature 100.

A lead 115 extends from the sleeve 103, and two further leads 116, 117 extend from the contacts to provide facilities for conducting currents to and from the switch contacts and in this respect the armature 100 corresponds to the armature 10 of FIGURE 1, while the contacts 101 and 102 correspond to the stationary contacts 11 and 12 of FIGURE 1, the Logcell of FIGURE 18 being adaptable to use in all the embodiments of the present invention illustrated in FIGURES 1 to 17, inclusive. The magnetic ring or annulus 110 provides a path for separate magnetic fluxes extending in both directions from the center of armature 100, through the contacts 101, 102 and back through the enclosing cylinders 111, 112. This magnetic field is balanced, so that the armature 100 may, due to forces of surface tension alone, remain in either of its actuated positions, when once actuated. The armature 100 is actuated in one sense or the other in response to selective energization of the coils 113, 114 to perform the various functions illustrated in FIGURES 1 to 16 of the accompanying drawings.

Due to the fact that polarization exists in the Logcell of FIGURE 18, a variety of effects are feasible, that were not feasible in the system of S.N. 180,090. For example, if the right hand coil 114 is energized in such sense as to oppose the magnetic field of the polarizing magnet 110, and if the right hand coil 114 alone were energized, the only remaining net magnetic field would be that existing on the left side of the armature 100, which accordingly would move to the left. On the other hand, if the current in the right hand winding 114 were such as to aid the polarizing magnet 110, then the magnetic force on the right hand side of the armature 100 would be greater and the armature would move to the right. Furthermore, when any net unbalance exists so that the armature tends to move in one sense or the other, its very movement would decrease the reluctance of the magnetic path in the direction in which it was moving, which would tend to accelerate its movement, and thus increase the ballistic effect in movement of the armature 100.

Even if the annular magnet 110 is not a permanent magnet, its presence enhances the operation of the system by providing a short magnetic path for magnetic flux produced by the right hand coil 114, as against the much longer magnetic path for flux which is produced by the right hand coil 114 and which passes through both contacts 101 and 102. The annulus 110 thus assures a net unbalance of magnetic force, when coil 114 is energized, which serves to move the armature 100 to the right. The central ring 110, accordingly, can act as a shunt path whether or not it is permanently magnetized, but when permanently magnetized adds a further feature, i.e., that of polarization. The fact of polarization implies that the switch operates differently depending on the direction in which current flows into the operating coils, and if the magnetic paths are considered to be a right hand path and a left hand path, each passing through the annulus 110, if the coil 114 in the right hand path opposes the polarizing field and equals it in field strength, the left hand path contains the net operating magnetic flux; while if the current in the right hand field aids the polarizing field there is an overbalance of forces. The armature 100, in the two separate cases will move in opposite directions. This fact implies that the various gating circuits of FIGURES 1 to 16, inclusive, can be made to operate in different ways depending on the directions of the currents flowing in the field coils 113, 114, or on the directions of the fluxes introduced in the magnetic field structures, and not alone on which one of the field windings is energized.

For example, if the currents into the two coils 113, 114, are such that both buck the polarizing field and provide fields which substantially equal same, the effect on the armature 100 is zero, since a balance of magnetic forces will exist, while if one coil aids while the other opposes, a doubled magnetic force exists on the armature in one direction. The balanced magnetic force set up by the central polarizing magnet, furthermore, tends to stabilize the armature against forces of vibration and shock, so that the Logcell need not rely alone upon surface tension forces to provide stability, even when both operating windings are de-energized. Furthermore, the Logcell, when polarized, becomes sensitive to polarity of magnetic field applied by a permanent magnet and can be caused to operate in various ways according to the location of the permanent magnet, as it approaches the Logcell, and in accordance furthermore with the polarity of the nearer pole of the permanent magnet. This property is particularly valuable in the system of FIGURE 17.

While I have described my invention by reference to various specific embodiments thereof, it will be clear that modifications can be derived by those skilled in the art, in accordance with presently understood techniques, and accordingly I desire to be limited only by the terms of the appended claims, in respect to the scope of the invention.

What I claim is:

1. A magnetic mercury relay, comprising a free magnetic armature having mercury wettable ends, stationary magnetic mercury wettable contacts adjacent to said ends, an enclosure for said armature and said ends, a layer of mercury within said enclosure, said armature being freely movable in said layer of mercury, a first substantially complete magnetic path including approximately half of said armature and one of said contacts, a second magnetic path extending about approximately the other half of said armature and the other one of said contacts, said first and second paths at their juncture approximately midway of said armature including a high permeability portion which constitutes a joint element of said paths and separate electromagnetic coils for separately inducing magnetic flux in said first and second magnetic paths.

2. The combination according to claim 1 wherein said joint element is magnetically polarized.

References Cited
UNITED STATES PATENTS

| | | | |
|---|---|---|---|
| 2,635,197 | 4/1963 | Routledge et al. | 317—140 X |
| 3,100,294 | 8/1963 | Dryden | 317—140 X |
| 3,144,533 | 8/1964 | Donath | 335—56 |
| 3,206,653 | 9/1965 | MacArthur | 317—155.5 |
| 3,230,383 | 1/1966 | MacArthur | 317—155.5 X |
| 3,289,197 | 11/1966 | Knight | 317—155.5 |

LEE T. HIX, *Primary Examiner.*